US012143349B2

(12) United States Patent
Im et al.

(10) Patent No.: US 12,143,349 B2
(45) Date of Patent: Nov. 12, 2024

(54) ELECTRONIC DEVICE FOR PROCESSING MESSAGE AND OPERATING METHOD THEREOF

(71) Applicant: Samsung Electronics Co., ltd., Gyeonggi-do (KR)

(72) Inventors: Byungjai Im, Gyeonggi-do (KR); Jinmin Kim, Gyeonggi-do (KR); Jinsung Kim, Gyeonggi-do (KR); Jeounggon Yoo, Gyeonggi-do (KR); Sangil Yoon, Gyeonggi-do (KR); Yeonho Jo, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 17/666,833

(22) Filed: Feb. 8, 2022

(65) Prior Publication Data

US 2022/0224729 A1   Jul. 14, 2022

Related U.S. Application Data

(63) Continuation of application No. PCT/KR2022/000162, filed on Jan. 5, 2022.

(30) Foreign Application Priority Data

Jan. 12, 2021   (KR) .................. 10-2021-0003827

(51) Int. Cl.
*H04L 51/06* (2022.01)
*H04L 65/1016* (2022.01)
*H04L 69/08* (2022.01)

(52) U.S. Cl.
CPC .......... *H04L 51/06* (2013.01); *H04L 65/1016* (2013.01); *H04L 69/08* (2013.01)

(58) Field of Classification Search
CPC ..... H04L 51/06; H04L 51/063; H04L 51/066; H04L 51/224; H04L 65/756;
(Continued)

(56) References Cited

U.S. PATENT DOCUMENTS 8,238,891 B1 * 8/2012 Tam ................. H04W 4/12
455/418
10,264,413 B1   4/2019 Bogineni et al.
(Continued)

FOREIGN PATENT DOCUMENTS

EP      3664384 A1       6/2020
KR   10-2015-0135065 A  12/2015
(Continued)

OTHER PUBLICATIONS

Acharya, Arup, Stefan Berger, and Chandra Narayanaswami. "Unleashing the power of wearable devices in a SIP infrastructure." Third IEEE International Conference on Pervasive Computing and Communications. IEEE, 2005. (Year: 2005).*
(Continued)

*Primary Examiner* — Vivek Srivastava
*Assistant Examiner* — William C McBeth
(74) *Attorney, Agent, or Firm* — Cha & Reiter, LLC

(57) ABSTRACT

According to an embodiment, an electronic device comprises: a first communication circuit; a second communication circuit; and at least one processor configured to be operatively connected to the first communication circuit and the second communication circuit, wherein the at least one processor is configured to: establish communication with a second electronic device through the second communication circuit, receive an IP multimedia subsystem (IMS)-based message from a first communication network through the first communication circuit, detect at least a portion corresponding to content of the IMS-based message by decoding
(Continued)

the IMS-based message, and transmit at least the portion corresponding to the content of the IMS-based message to the second electronic device through the second communication circuit.

7 Claims, 9 Drawing Sheets

(58) Field of Classification Search
CPC ... H04L 65/1016; H04L 51/04; H04L 51/046; H04L 51/08; H04L 51/10; H04W 4/12; H04W 4/18; H04W 4/80; H04W 88/04
See application file for complete search history.

(56) References Cited

U.S. PATENT DOCUMENTS

| | | | |
|---|---|---|---|
| 2009/0168758 A1* | 7/2009 | Apelqvist | H04L 65/104 370/352 |
| 2010/0227631 A1* | 9/2010 | Bolton | H04L 51/224 455/466 |
| 2011/0264817 A1* | 10/2011 | Raveendran | H04L 65/756 709/230 |
| 2014/0057667 A1 | 2/2014 | Blankenship et al. | |
| 2015/0130685 A1* | 5/2015 | Kim | G06F 3/147 345/3.1 |
| 2015/0223045 A1 | 8/2015 | Sandblad | |
| 2015/0341900 A1* | 11/2015 | Jeong | H04L 51/224 455/458 |
| 2016/0028584 A1 | 1/2016 | Lee et al. | |
| 2016/0205245 A1* | 7/2016 | Kim | H04L 51/10 455/414.1 |
| 2016/0212725 A1* | 7/2016 | Qiu | H04W 76/14 |
| 2016/0234366 A1* | 8/2016 | De Filippis | H04W 4/18 |
| 2016/0270134 A1 | 9/2016 | Stojanovski | |
| 2016/0286027 A1 | 9/2016 | Lee et al. | |
| 2016/0323213 A1* | 11/2016 | Hong | H04L 51/066 |
| 2017/0070456 A1 | 3/2017 | Norhammar et al. | |
| 2017/0295178 A1 | 10/2017 | Cheng et al. | |
| 2018/0019958 A1 | 1/2018 | Synal | |
| 2018/0184305 A1 | 6/2018 | Shen et al. | |
| 2018/0205882 A1 | 7/2018 | Zeng | |
| 2019/0037518 A1 | 1/2019 | Russell et al. | |
| 2019/0066261 A1* | 2/2019 | Ma | H04L 51/08 |
| 2019/0253368 A1 | 8/2019 | Kim et al. | |
| 2020/0265181 A1 | 8/2020 | Kim et al. | |
| 2021/0014182 A1* | 1/2021 | Stafford | H04L 51/066 |
| 2021/0084137 A1* | 3/2021 | Kang | H04L 51/10 |

FOREIGN PATENT DOCUMENTS

| | | |
|---|---|---|
| KR | 10-2019-0096589 A | 8/2019 |
| KR | 10-2020-0099845 A | 8/2020 |
| WO | 2002-041629 A1 | 5/2002 |
| WO | 2019/023122 A1 | 1/2019 |

OTHER PUBLICATIONS

Seneviratne, Suranga, et al. "A survey of wearable devices and challenges." IEEE Communications Surveys & Tutorials 19.4 (2017) : 2573-2620. (Year: 2017).*

Zhong, Lin, Bin Wei, and Michael J. Sinclair. "SMERT: energy-efficient design of a multimedia messaging system for mobile devices." Proceedings of the 43rd annual Design Automation Conference. 2006. (Year: 2006).*

International Search Report dated Apr. 11, 2022.
Written Opinion dated Apr. 11, 2022.
Extended European Search Report dated May 2, 2024.

* cited by examiner

ELECTRONIC DEVICE FOR PROCESSING MESSAGE AND OPERATING METHOD THEREOF

CROSS-REFERENCE TO RELATED APPLICATION

This application is a continuation of International Application No. PCT/KR2022/000162 filed on Jan. 5, 2022 which is based on and claims priority under 35 U.S.C. § 119 to Korean Patent Application No. 10-2021-0003827, filed on Jan. 12, 2021, in the Korean Intellectual Property Office, the disclosure of which is incorporated by reference herein in its entirety.

TECHNICAL FIELD

Certain embodiments of the disclosure relate to a device and a method for an electronic device to process a message through a wearable device.

BACKGROUND ART

With the development of information and communication technology as well as semiconductor technology, electronic devices can provide a diversity of multimedia functions. The multimedia functions may include at least one of a voice call function, a video call function, a message function, a broadcast function, a wireless Internet function, a camera function, an electronic payment function, or a content playback function.

Electronic devices are evolving into various types to enhance the convenience of users in using multimedia functions. For example, an electronic device may be a wearable device in a form, such as clothing, glasses, a watch, or a bracelet.

A wearable device may interwork with an electronic device, such as a smartphone. For example, when the electronic device (e.g., smartphone) receives a message from a network or an external electronic device, the electronic device (e.g., smartphone) may transmit the message to the wearable device. The wearable device may output information related to the message provided from the electronic device (e.g., smartphone).

The electronic device (e.g., smartphone), in the foregoing example, may restrict transmission of some messages to the wearable device. For example, when determining that a wearable device does not support a message (or the type of the message), the electronic device (e.g., smartphone) might not transmit the message to the wearable device. In this case, a user wearing the wearable device cannot identify information related to the reception of the message through the wearable device. This can be inconvenient as the user may need to additionally review the electronic device (e.g., smartphone) in order to identify the message.

SUMMARY

Certain embodiments of the disclosure disclose a device and a method for an electronic device to process a message through a wearable device.

According to an embodiment, an electronic device comprises: a first communication circuit; a second communication circuit; and at least one processor configured to be operatively connected to the first communication circuit and the second communication circuit, wherein the at least one processor is configured to: establish communication with a second electronic device through the second communication circuit, receive an IP multimedia subsystem (IMS)-based message from a first communication network through the first communication circuit, detect at least a portion corresponding to content of the IMS-based message by decoding the IMS-based message, and transmit at least the portion corresponding to the content of the IMS-based message to the second electronic device through the second communication circuit.

According to certain embodiments, an operating method of an electronic device comprises: establishing communication with a second electronic device; receiving an IP multimedia subsystem (IMS)-based message from a first communication network; detecting at least a portion corresponding to content of the IMS-based message by decoding the IMS-based message; and transmitting at least the portion corresponding to the content of the IMS-based message to a second electronic device.

According to certain embodiments, an electronic device comprises: a display; a communication circuit; and at least one processor configured to be operatively connected to the communication circuit and the display, wherein the at least one processor is configured to: establish communication with another electronic device through the communication circuit, receive message reception information from the another electronic device through the communication circuit, detect identification information related to a message received by the another electronic device and data from the message reception information, generate a reception message, based on the identification information and the data, and control the display to display the reception message.

According to certain embodiments of the disclosure, an electronic device may extract at least a portion (e.g., text or an image) of a message not supported by a wearable device from the message and may transmit the portion to the wearable device, thereby processing the message (or the type of the message) not supported by the wearable device in the wearable device.

DETAILED DESCRIPTION

Presented herein is a way for a first electronic device to receive a message from a network, and provide the message to a second electronic device. The network can comprise, but is not limited to, a cellular network. Although the first electronic device and second electronic devices will be described using the example of a smartphone and a smartwatch, respectively, it shall be understood, that the first electronic device is not limited to the smartphone and the second electronic device is not limited to a smartwatch. Indeed, the first electronic device can be a smartwatch, and the second electronic device can be a smartphone.

Figure 1:
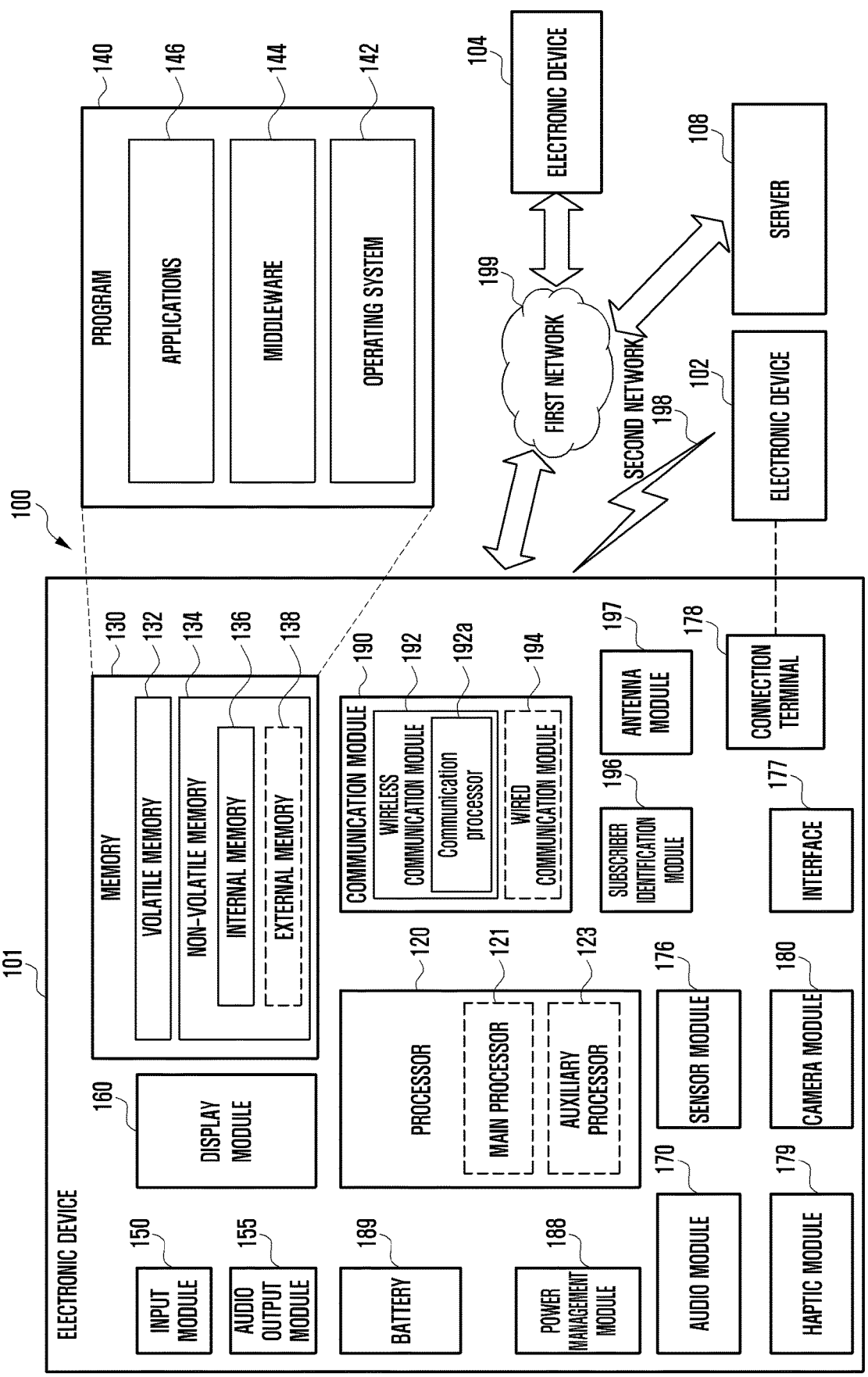
FIG. 1 is a block diagram of an electronic device in a network environment according to certain embodiments.

FIG. 1 describes an electronic device.

Electronic Device

Hereinafter, various example embodiments will be described in greater detail with reference to the figures.

FIG. 1 is a block diagram illustrating an example electronic device 101 in a network environment 100 according to certain embodiments. Referring to FIG. 1, the electronic device 101 in the network environment 100 may communicate with an electronic device 102 via a second network 198 (e.g., a short-range wireless communication network), or at least one of an electronic device 104 or a server 108 via a first network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In certain embodiments, at least one of the components (e.g., the connecting terminal 178) may be omitted from the electronic device 101, or one or more other components may be added in the electronic device 101. In certain embodiments, some of the components (e.g., the sensor module 176, the camera module 180, or the antenna module 197) may be implemented as a single component (e.g., the display module 160).

The term "processor" shall be understood to refer to both the singular and plural contexts. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the second network 198 (e.g., a short-range communication network, such as Bluetooth™, wireless-fidelity (Wi-Fi) direct, or infrared data association (IrDA)) or the first network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the second network 198 or the first network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the first network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the second network 198 or the first network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the first network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the first network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with certain embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

It is noted that the electronic device 101 can receive messages from first network 199, which can be, but is not limited to, a cellular network. Moreover, the electronic device 101 may be associated with another electronic device 102 via second network 198. The second network 198 can be, but is not limited to, a Bluetooth network, or WiFi network. The electronic device 101, a first electronic device, may provide the message from the first network 199 to electronic device 102, a second electronic device.

Providing Message to Second Electronic Device

Figure 2:
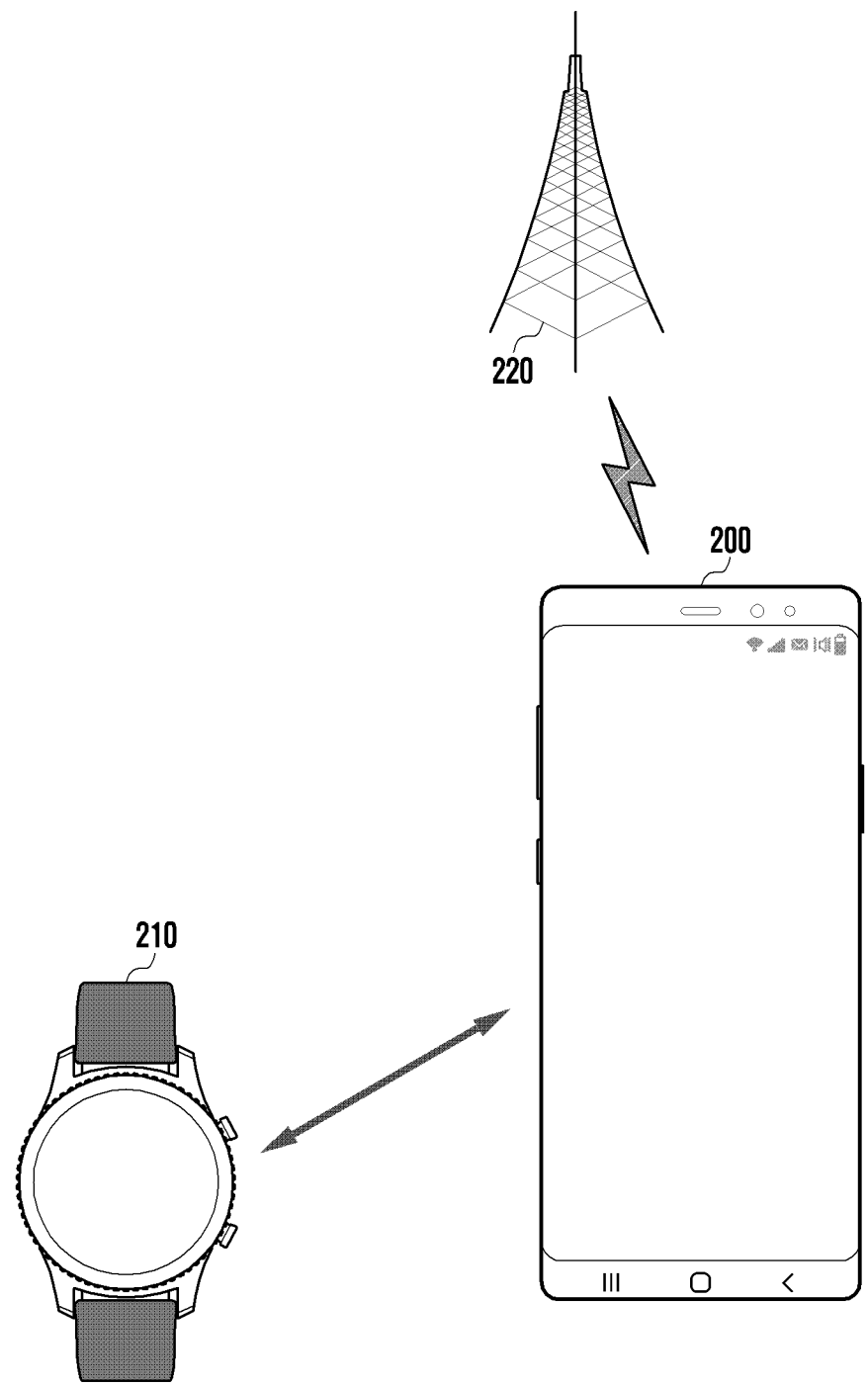
FIG. 2 illustrates an example of a wireless communication system providing a network of an electronic device and a wearable device according to certain embodiments.

FIG. 2 illustrates an example of a wireless communication system providing a network of an electronic device and a wearable device according to certain embodiments. According to an embodiment, the electronic device (e.g., smartphone) 200 of FIG. 2 and/or the wearable device 210 may be at least partly similar to the electronic device 101 of FIG. 1 or may further include other embodiments of the electronic device.

According to certain embodiments with reference to FIG. 2, the electronic device 200 may communicate with an external device 220, based on a first wireless network. The first wireless network may include, for example, at least one of a 2G network, a 3G network, a 4G network (e.g. a Long-Term Evolution (LTE) network), or a 5G network (e.g. a New Radio (NR) network). The external device 220 may include, for example, at least one of a different electronic device, a base station, a transmission node, or a server. This document will now refer to the external device 220 as a base station with the understanding that the base station 220 is not limited to a base station.

According to certain embodiments, the electronic device 200, which can be a smartphone, and the wearable device 210, which can be a smartwatch, may communicate with each other through a second wireless network. This document will now refer to electronic device 200 as a smartphone 200 with the understanding that the electronic device 200 is not limited to a smartphone. It shall also be understood that the electronic device 200 can include a wearable device. It shall also be understood that the device receiving the message from the electronic device 200 is not limited to a wearable device 210, and may include a smartphone. According to an embodiment, the smartphone 200 and the wearable device 210 may transmit and/or receive a signal and/or data through the second wireless network different from the first wireless network. For example, the second wireless network may include at least one of a wireless LAN, Bluetooth, Bluetooth Low Energy (BLE), or infrared communication.

The smartphone 200 may transmit a message received from the base station 220 to the wearable device 210. When receiving a message from the base station 220, the smartphone 200 may identify whether the message (or the type of the message) received from the base station 220 is supported by the wearable device 210. For example, when the wearable device 210 supports the message (or the type of the message), the smartphone 200 may transmit the message to the wearable device 210. In another example, when the wearable device 210 does not support the message (or the type of the message), the smartphone 200 may extract at least a portion of the message, and may transmit the portion to the wearable device 210. For example, the smartphone 200 may transmit message reception information to the wearable device 210. The message reception information may include at least a portion corresponding to the content of the message. For example, "not supporting the message" (or the type of message) may include a case where the wearable device 210 cannot decode the message or cannot recognize information included in the message. For example, the content of the message is substance of the message that the base station 220 wants to transmit to the smartphone 200 (or a user of the smartphone 200) through the message and may include text, a symbol, an image, or a video. For example, at least the portion corresponding to the content of the message may include data related to a specified content type among data included in a data area (e.g., payload) of the message or an image included in the message.

The wearable device 210 may output the message received from the smartphone 200. When receiving the message from the smartphone 200, the wearable device 210 may display a notification related to the message received from the smartphone 200 and/or the substance of the message. When receiving the message reception information from the smartphone 200, the wearable device 210 may detect the content (or text) of the message received by the smartphone 200 from the base station 220 and identification information of the message from the message reception information. The wearable device 210 may generate a reception message, based on the content (or text) of the message and the identification information of the message. The wearable device 210 may display a notification of the reception message and/or substance of the message. According to an embodiment, the wearable device 210 may detect a thumbnail related to an image from the message reception information received from the smartphone 200. The wearable device 210 may display the thumbnail related to the image.

First Electronic Device/Smartphone

Figure 3:
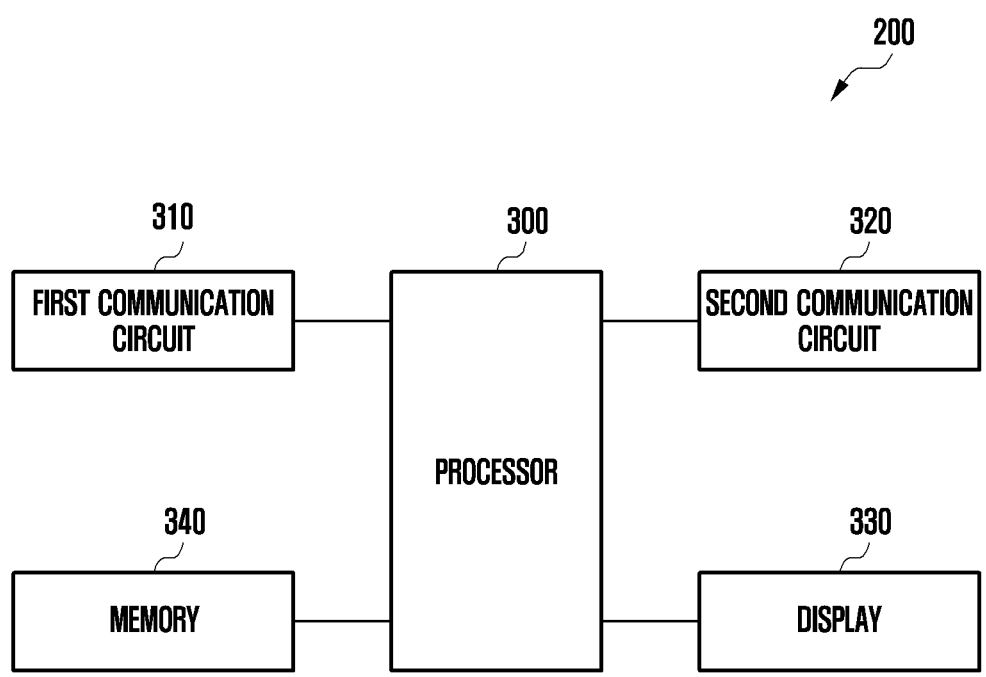
FIG. 3 is a block diagram of an electronic device for processing a message according to certain embodiments.

FIG. 3 is a block diagram of an electronic device for processing a message according to certain embodiments. According to an embodiment, the smartphone 200 of FIG. 3 may be at least partly similar to the electronic device 101 of FIG. 1 or may further include other embodiments of the electronic device.

Referring to FIG. 3, according to certain embodiments, the smartphone 200 may include a processor 300, a first communication circuit 310, a second communication circuit 320, a display 330, and/or a memory 340. According to an embodiment, the processor 300 may be substantially the same as the processor 120 of FIG. 1 or may be included in the processor 120. The first communication circuit 310 and/or the second communication circuit 320 may be substantially the same as the wireless communication module 192 of FIG. 1 or may be included in the wireless communication module 192. The display 330 may be substantially the same as the display module 160 of FIG. 1 or may be included in the display module 160. The memory 340 may be substantially the same as the memory 130 of FIG. 1 or may be included in the memory 130.

The processor 300 may control the first communication circuit 310, the second communication circuit 320, the display 330, and/or the memory 340 which are operatively connected. According to an embodiment, the processor 300 may include an application processor (AP) and/or a communication processor (CP).

The processor 300 may control the first communication circuit 310 to communicate with a base station 220, based on a first wireless network. For example, the first wireless network may include at least one of a 2G network, a 3G network, a 4G network (e.g., a Long-Term Evolution (LTE) network), or a 5G network (e.g., a New Radio (NR) network).

The processor 300 may control the second communication circuit 320 to communicate with a wearable device 210, based on a second wireless network. For example, the second wireless network may include at least one of a wireless LAN, Bluetooth, Bluetooth Low Energy (BLE), or infrared communication.

The processor 300 may control the second communication circuit 320 to transmit a message received from the base station 220 through the first communication circuit 310 to the wearable device 210. When receiving the message from the base station 220, the processor 300 may identify whether the wearable device 210 supports the message (or type of the message). For example, when the message is an Internet Protocol (IP) multimedia subsystem (IMS)-based message, the processor 300 may determine that the wearable device 210 does not support the message (or type of the message). In another example, the processor 300 may identify a capability of the wearable device 210 and identify whether the wearable device 210 supports the message (or type of the message), based on the capability of the wearable device 210. For example, the IMS-based message is a standardized message for providing an IMS-based communication service and may include a Rich Communication Suite or Rich Communication Services (RCS) message.

When it is determined that the wearable device 210 supports the message (or type of the message), the processor 300 may control the second communication circuit 320 to transmit the message to the wearable device 210.

When receiving the message through the first communication circuit 310, the processor 300 may control the display 330 to display information related to the message.

When the wearable device 210 does not support the message, the processor 300 may extract at least that portion of the message that corresponds to the content. The processor 300 may decode the message, detect raw data related to a specified content type (e.g., an RSC chat bot message) form the data included in a data area (e.g., payload) of the decoded message and identification information of the message. For example, the specified content type may refer to a content type (e.g., a chat bot message type, an application-to-person (A2P) type, or a person-to-person (P2P) type) of a message that is being transmitted to the wearable device 210 that does not support a message. The processor 300 may detect an image included in the data area of the decoded message.

The processor 300 may control the second communication circuit 320 to transmit at least the portion corresponding to the content of the message to the wearable device 210. The processor 300 may control the second communication circuit 320 to transmit message reception information including the raw data and the identification information to the wearable device 210. For example, the identification information of the message may include information for identifying the sending party. For example, the identification information of the message may include at least one of a callback number, information (e.g., a bot name) about a transmission agent, or a short message service (SMS) number.

The processor 300 may generate a thumbnail of a first image quality. The thumbnail may be a lower resource consuming image that is based on the image detected from the message. As a result of consuming less resources, such as less data or bandwidth, the thumbnail image may be of lower quality than the image in the message, yet a useful to a user for discerning the content of the image. The processor 300 may control the second communication circuit 320 to transmit the thumbnail to the wearable device 210. For example, the processor 300 may control the second communication circuit 320 to transmit the identification information with the thumbnail to the wearable device 210. When receiving an original image request signal from the wearable device 210 through the second communication circuit 320, the processor 300 may control the second communication circuit 320 to transmit a second thumbnail of a higher image quality than the first thumbnail. The second thumbnail can be generated based on the image from the message, and consume more resources (such as data or bandwidth) than the first thumbnail.

The processor 300 may control the second communication circuit 320 to transmit the image from the message to the wearable device 210 separately from transmission of the second thumbnail. For example, the thumbnail of the higher image quality may be generated based on an input related to an original image request received through an input module (not shown) of the smartphone 200 or the original image request signal received from the wearable device 210 through the second communication circuit 320. For example, an image quality may be configured based on at least one of the resolution, brightness, or definition of the image (or thumbnail).

The first communication circuit 310 may support wireless communication with the base station 220 through the first wireless network. According to an embodiment, the first communication circuit 310 may include a first radio frequency integrated circuit (RFIC) and a first radio frequency front end (RFFE) for communication with the base station 220 through the first wireless network.

The second communication circuit 320 may support wireless communication with the wearable device 210 through the second wireless network. The second communication circuit 320 may include a second RFIC and a second RFFE for wireless communication with the wearable device 210 through the second wireless network.

The display 330 may display information processed by the smartphone 200. The display 330 may display information related to the message received from the base station 220, based on control by the processor 300. For example, the information related to the message may include at least one of reception notification information about the message or the substance of the message.

The memory 340 may store various types of data used by at least one component (e.g., the processor 300, the first communication circuit 310, the second communication circuit 320, or the display 330) included in the smartphone 200. For example, the data may include information related to the specified content type. According to an embodiment, the memory 340 may store various instructions executable through the processor 300.

The smartphone 200 may configure a message not supported by the wearable device 210 into a message in a form that is supported by the wearable device 201, and may transmit the message to the wearable device 210. When determining that the wearable device 210 does not support the message (or type of the message), the processor 300 may extract at least that portion corresponding to content of the message by decoding the message. The processor 300 may generate a message in a form supported by the wearable device 210, based on at least a portion of the message. The second communication circuit 320 may transmit the message generated by the processor 300 to the wearable device 210. For example, the message in the form supported by the wearable device 210 may include an SMS message or a multimedia messaging service (MMS) message.

Second Electronic Device/Wearable Device

Figure 4:
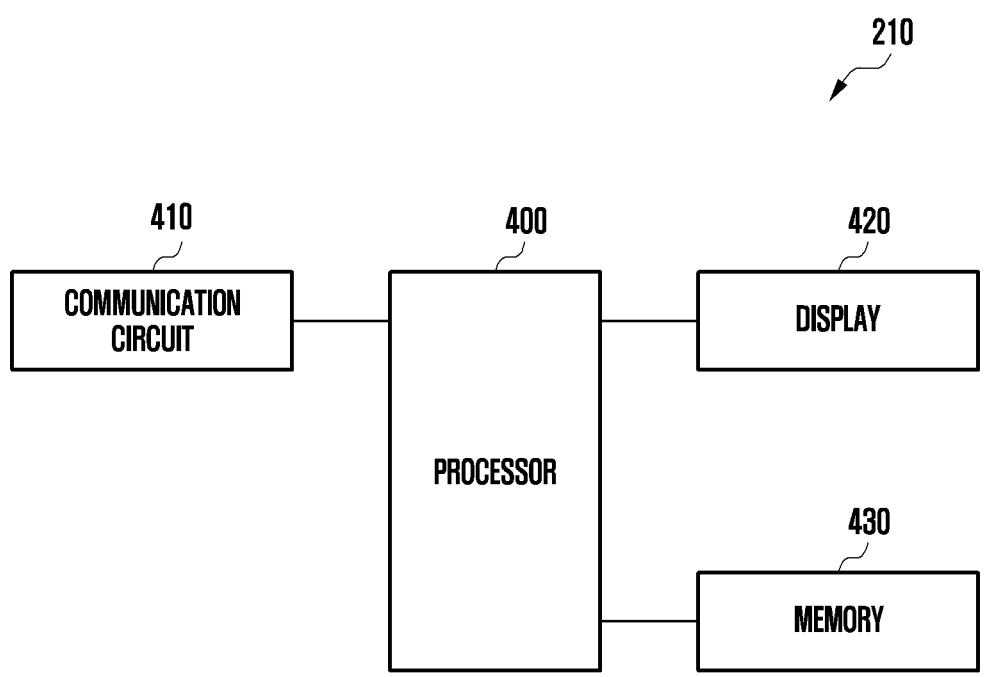
FIG. 4 is a block diagram of a wearable device for processing a message according to certain embodiments.

FIG. 4 is a block diagram of a wearable device for processing a message according to certain embodiments. The wearable device 210 of FIG. 4 may be at least partly similar to the electronic device 101 of FIG. 1 or may further include other embodiments of the electronic device. The wearable device may include, but is not limited to, a smartwatch, clothing, glasses, or a bracelet, among other devices.

The wearable device 210 may include a processor 400, a communication circuit 410, a display 420, and/or a memory 430. According to an embodiment, the processor 400 may be substantially the same as the processor 120 of FIG. 1 or may be included in the processor 120. The communication circuit 410 may be substantially the same as the wireless communication module 192 of FIG. 1 or may be included in the wireless communication module 192. The display 420 may be substantially the same as the display module 160 of FIG. 1 or may be included in the display module 160. The memory 430 may be substantially the same as the memory 130 of FIG. 1 or may be included in the memory 130.

The processor 400 may control the communication circuit 410, the display 420, and/or the memory 430 which are operatively connected. According to an embodiment, the processor 400 may include an application processor (AP) and/or a communication processor (CP).

The processor 400 may control the communication circuit 410 to communicate with an smartphone 200, based on a second wireless network. For example, the second wireless network may include at least one of a wireless LAN, Bluetooth, Bluetooth Low Energy (BLE), or infrared communication.

When receiving a message from the smartphone 200 via the communication circuit 410, the processor 400 may control the display 420 to display information related to the message.

When receiving message reception information from the smartphone 200, the processor 400 may generate a reception message. The reception message may be based on the message reception information. For example, the message reception information may include raw data related to a specified content type and identification information of the message. The raw data can be the data included in a data area of the message.

The processor 400 may detect text information of the message from a specified format (e.g., open rich card) and data in a specified format (e.g., JavaScript Object Notation (JSON) data). The text information and data in the specified format can be included in the raw data of the message.

The processor 400 may generate a reception message, based on the text information and the identification information. For example, the reception message can be a message supported by the wearable device 210 and may include an SMS message or an MMS message. For example, the identification information of the message is information for identifying the base station 220 that has transmitted the message to the smartphone 200 and may include at least one of a callback number, information (e.g., a bot name) about a transmission agent of the message, or a short message service (SMS) number. The processor 400 may control the display 420 to display information related to the reception message generated based on the message reception information.

When receiving image-related information from the smartphone 200, the processor 400 may control the display 420 to display the image-related information. The processor 400 may control the display 420 to display a first thumbnail of a first image quality, received via communication circuit 410. The processor 400 may generate a reception message, based on the first thumbnail and the identification information. The processor 400 may control the display 420 to display the reception message.

When receiving information related to an original image request, the processor 400 may control the communication circuit 410 to transmit an original image request signal to the smartphone 200. For example, the information related to the original image request may include an input received through an input module (not shown) of the wearable device 210. The wearable device 210 may display the reception message in a graphical user interface that includes an object for requesting the original image, such as a virtual button. In response to selection of the virtual button, the wearable device 210 may transmit the request signal to the smartphone 200.

When receiving a second thumbnail of a second image quality, which is a relatively higher image quality than the first image quality, the processor 400 may control the display 420 to display the second thumbnail. For example, the processor 400 may control the display 420 to replace the first thumbnail with the second thumbnail.

When receiving an image detected from the message separately from the second thumbnail, the processor 400 may store the image detected from the message in the memory 430. The processor 400 may additionally discard the second thumbnail from the memory, or overwrite the second thumbnail with the image.

The communication circuit 410 may support wireless communication with the smartphone 200 through the second wireless network. The communication circuit 410 may include an RFIC and an RFFE for communication with the smartphone 200 through the second wireless network.

The display 420 may display information processed by the wearable device 210. The display 420 may display information related to the message received from the smartphone 200, based on control by the processor 400. For example, the information related to the message may include at least one of reception notification information about the message or substance of the message. The display 420 may display information related to a reception message generated by the processor 400, based on control by the processor 400. For example, the information related to the reception message may include at least one of notification information about the reception message or substance of the reception message. The display 420 may display an image received from the smartphone 200, based on control by the processor 400.

The memory 430 may store various types of data used by at least one component (e.g., the processor 400, the communication circuit 410, or the display 420) included in the wearable device 210. For example, the data may include an image (or original image) detected in the message received from the smartphone 200. According to an embodiment, the memory 430 may store various instructions executable through the processor 400.

An electronic device (e.g., the electronic device 101 of FIG. 1 or the smartphone 200 of FIG. 2 or FIG. 3) may include a first communication circuit (e.g., the wireless communication module 192 of FIG. 1 or the first communication circuit 310 of FIG. 3), a second communication circuit (e.g., the wireless communication module 192 of FIG. 1 or the second communication circuit 320 of FIG. 3), and at least one processor (e.g., the processor 120 of FIG. 1 or the processor 300 of FIG. 3) configured to be operatively connected to the first communication circuit and the second communication circuit, wherein the processor may establish communication with a wearable device through the second communication circuit, may receive an IP multimedia subsystem (IMS)-based message from an external device through the first communication circuit, may detect at least a portion corresponding to content of the IMS-based message by decoding the IMS-based message, and may transmit at least the portion corresponding to the content of the IMS-based message to the wearable device through the second communication circuit.

The IMS-based message may include a Rich Communication Services or Rich Communication Suite (RCS) message.

The processor may decode the IMS-based message, may detect raw data related to a specified content type and identification information of the message from the decoded message, and may transmit the detected raw data and identification information of the message to the wearable device through the second communication circuit.

The identification information of the message may include at least one of a callback number, a short message service (SMS) number, or a name related to a transmission agent of the message.

The processor may decode the IMS-based message, may generate a first thumbnail of a first image quality related to an image when the decoded message includes the image, and may transmit the first thumbnail to the wearable device through the second communication circuit.

The processor may generate a second thumbnail of a second image quality higher than the first image quality, when receiving information related to an original image request from the wearable device through the second communication circuit, may transmit the second thumbnail to the wearable device, and may transmit the image detected from the message to the wearable device.

The first communication circuit may support cellular communication or wireless local area network communication, and the second communication circuit may support Bluetooth or Bluetooth Low Energy (BLE).

The electronic device may further include a display (e.g., the display module 160 of FIG. 1 or the display 330 of FIG. 3), wherein the processor may control the display to display information related to the IMS-based message.

A wearable device (e.g., the electronic device 101 of FIG. 1 or the wearable device 210 of FIG. 2 or FIG. 4) may include a display (e.g., the display module 160 of FIG. 1 or the display 420 of FIG. 4), a communication circuit (e.g., the wireless communication module 192 of FIG. 1 or the communication circuit 410 of FIG. 4), and at least one processor (e.g., the processor 120 of FIG. 1 or the processor 400 of FIG. 4) configured to be operatively connected to the communication circuit and the display, wherein the processor may establish communication with an electronic device through the communication circuit, may receive message reception information from the electronic device through the communication circuit, may detect identification information related to a message received by the electronic device from an external device and data from the message reception information, may generate a reception message, based on the identification information and the data, and may control the display to display the reception message.

The processor may detect data in a specified format of an open rich card format from raw data included in the message reception information, and may detect text included in the message received by the electronic device from the external device from the data in the specified format of the open rich card format.

Figure 5:
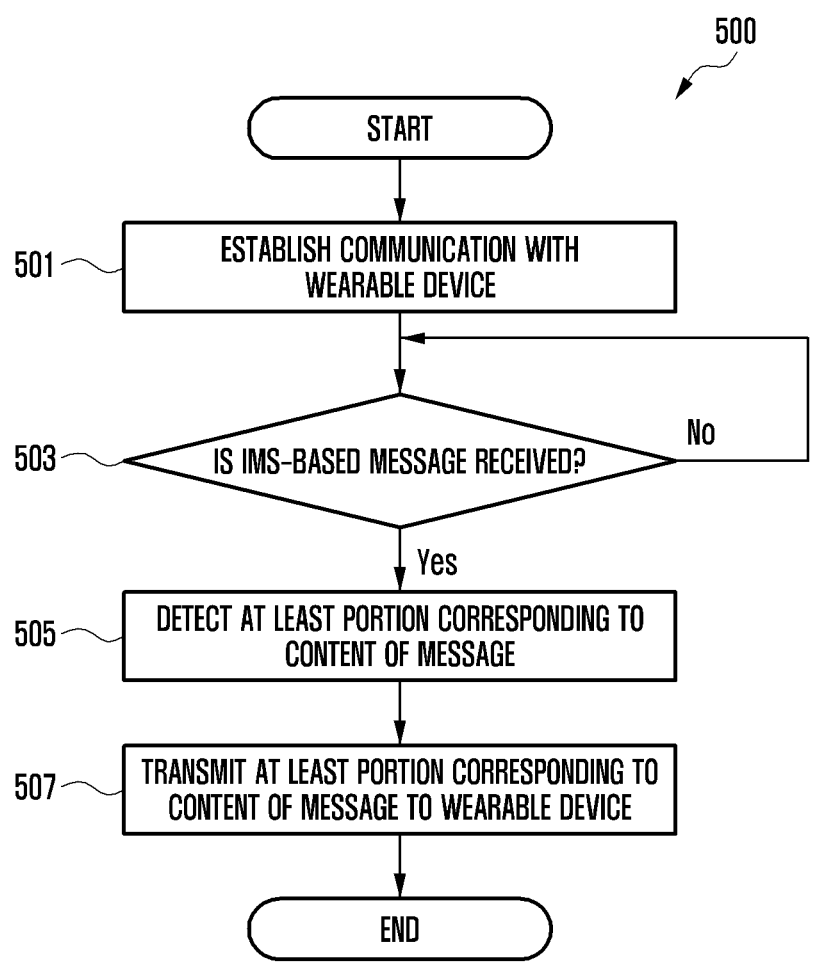
FIG. 5 is a flowchart showing that an electronic device transmits at least a portion of a message to a wearable device according to certain embodiments.

FIG. 5 is a flowchart 500 showing that an electronic device transmits at least a portion of a message to a wearable device according to certain embodiments. In the following embodiment, operations may be sequentially performed but are not necessarily sequentially performed. For example, the operations may be performed in a different order, or at least two operations may be performed in parallel. For example, the electronic device of FIG. 5 may be the electronic device 101 of FIG. 1 or the smartphone 200 of FIG. 2 or 3.

The electronic device (e.g., the processor 120 or the wireless communication module 192 of FIG. 1 or the processor 300 or the second communication circuit 320 of FIG. 3), or smartphone 200 may establish communication with the wearable device 210 in operation 501. The processor 300 may control the second communication circuit 320 to establish the communication with the wearable device 210 through a second wireless network.

The smartphone 300 may identify whether an IMS-based message is received from an base station 220 in operation 503. The processor 300 may control the first communication circuit 310 to communicate with the base station 220 through a first wireless network. The processor 300 may receive the IMS-based message from the base station 220 through the first communication circuit 310. For example, the IMS-based message is a standardized message for providing an IMS-based communication service and may include an RCS message.

According to certain embodiments, when no IMS-based message is received from the base station 220 (e.g., No in operation 503), the electronic device (e.g., the processor 120 or 300) may continue waiting until there is an IMS-based message (repeat operation 503).

When receiving the IMS-based message from the base station 220 (e.g., Yes in operation 503), the electronic device (e.g., the processor 120 or 300) may detect at least a portion corresponding to content of the IMS-based message in operation 505. When receiving the IMS-based message from the base station 220, the processor 300 may determine that the IMS-based message is not supported by the wearable device 210. When it is determined that the IMS-based message is not supported by the wearable device 210, the processor 300 may decode the message received from the base station 220. For example, the processor 300 may detect raw data related to a specified content type (e.g., an RSC chat bot message) and identification information of the message. The raw data may be among data included in the data area (e.g., payload) of the decoded message. In another example, the processor 300 may detect an image from the data area of the decoded message.

In operation 507, the electronic device (e.g., the processor 120 or 300, the wireless communication module 192, or the second communication circuit 320) may transmit at least the portion corresponding to the content of the IMS-based message to the wearable device 210. The processor 300 may control the second communication circuit 320 to transmit message reception information including the raw data and the identification information of the message to the wearable device 210. For example, the identification information of the message may include information for identifying the party that has transmitted the message (e.g., a callback number, information about a transmission agent of the message, or an SMS number).

The processor 300 may generate a first thumbnail based on the image detected from the message. The first thumbnail may have a first image quality. The processor 300 may control the second communication circuit 320 to transmit the first thumbnail to the wearable device 210. For example, the processor 300 may control the second communication circuit 320 to additionally transmit a thumbnail of a second image quality, which is a higher image quality than the first image quality, and/or the image (e.g., an original image) detected from the message to the wearable device 210.

When receiving the message from the base station 220, the smartphone 200 may display at least one of reception notification information about the message or substance of the message on at least a portion of a display area of a display 330.

The smartphone 200 may determine whether the wearable device 210 supports the message received from the base station 220, based on a capability of the wearable device 210. When determining that the wearable device 210 supports the message received from the base station 220, based on the capability of the wearable device 210, the smartphone 200 may transmit the message received from the base station 220 to the wearable device 210. According to an embodiment, when determining that the wearable device 210 does not support the message received from the base station 220, based on the capability of the wearable device 210, the smartphone 200 may detect at least a portion corresponding to the content of the message received from the base station 220 and may transmit the portion to the wearable device 210 (e.g., operation 505 and operation 507). For example, the capability of the wearable device 210 may be received from the wearable device 210 in the operation of establishing the communication with the wearable device 210.

Figure 6:
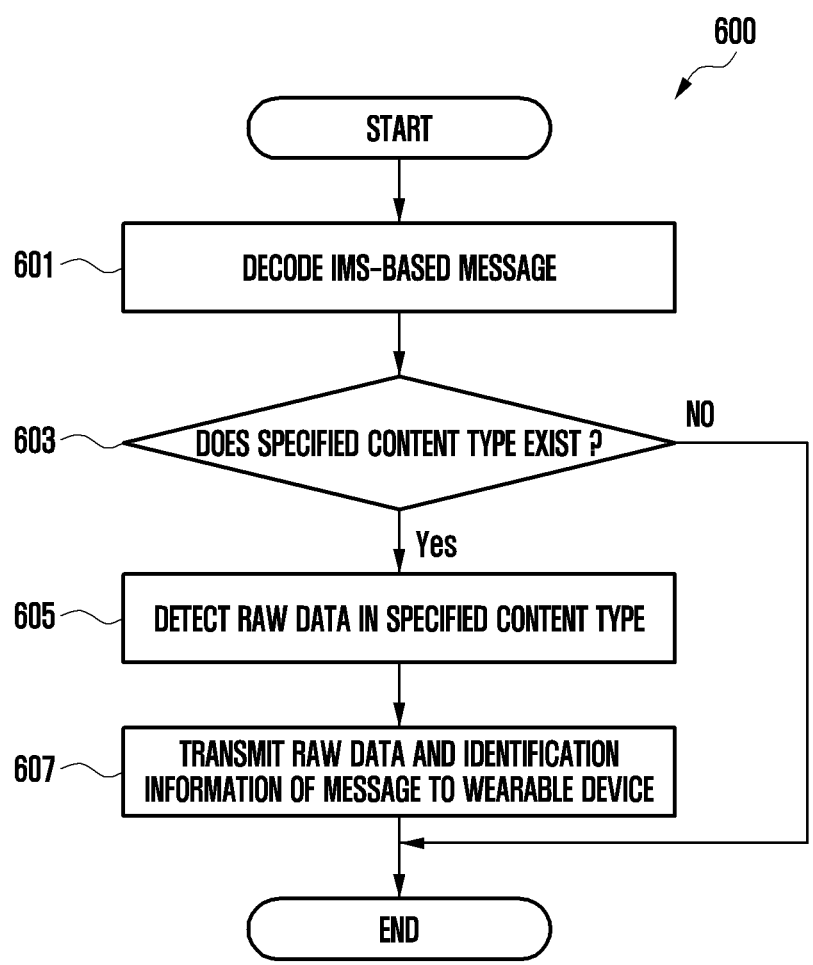
FIG. 6 is a flowchart showing that an electronic device transmits message reception information to a wearable device according to certain embodiments.

FIG. 6 is a flowchart 600 showing that an electronic device transmits message reception information to a wearable device according to certain embodiments. According to an embodiment, operations of FIG. 6 may be detailed operations of operation 505 and operation 507 of FIG. 5. In the following embodiment, the operations may be sequentially performed but are not necessarily sequentially performed. For example, the operations may be performed in a different order, or at least two operations may be performed in parallel. For example, the electronic device of FIG. 6 may be the electronic device 101 of FIG. 1 or the smartphone 200 of FIG. 2 or 3.

When receiving an IMS-based message from a base station 220 (e.g., Yes in operation 503 of FIG. 5), the electronic device (e.g., the processor 120 of FIG. 1 or the processor 300 of FIG. 3) may decode the message in operation 601. When determining that the wearable device 210 does not support the IMS-based message, the processor 300 may decode the message received from the base station 220.

In operation 603, the electronic device (e.g., the processor 120 or 300) may identify whether a specified content type is included in the decoded message. The processor 300 may identify whether data related to the specified content type (e.g., an RSC chat bot message) is included in a data area (e.g., payload) of the decoded message.

When no specified content type is included in the decoded message (e.g., No in operation 603), the electronic device (e.g., the processor 120 or 300) may terminate an embodiment for transmitting message reception information to the wearable device.

When the specified content type is included in the decoded message (e.g., Yes in operation 603), the electronic device (e.g., the processor 120 or 300) may detect raw data related to the specified content type in the decoded message. The processor 300 may detect the raw data related to the specified content type among data included in the data area (e.g., payload) of the decoded message.

In operation 607, the electronic device (e.g., the processor 120 or 300, the wireless communication module 192, or the second communication circuit 320) may transmit message reception information including the raw data and identification information to the wearable device 210.

Figure 7:
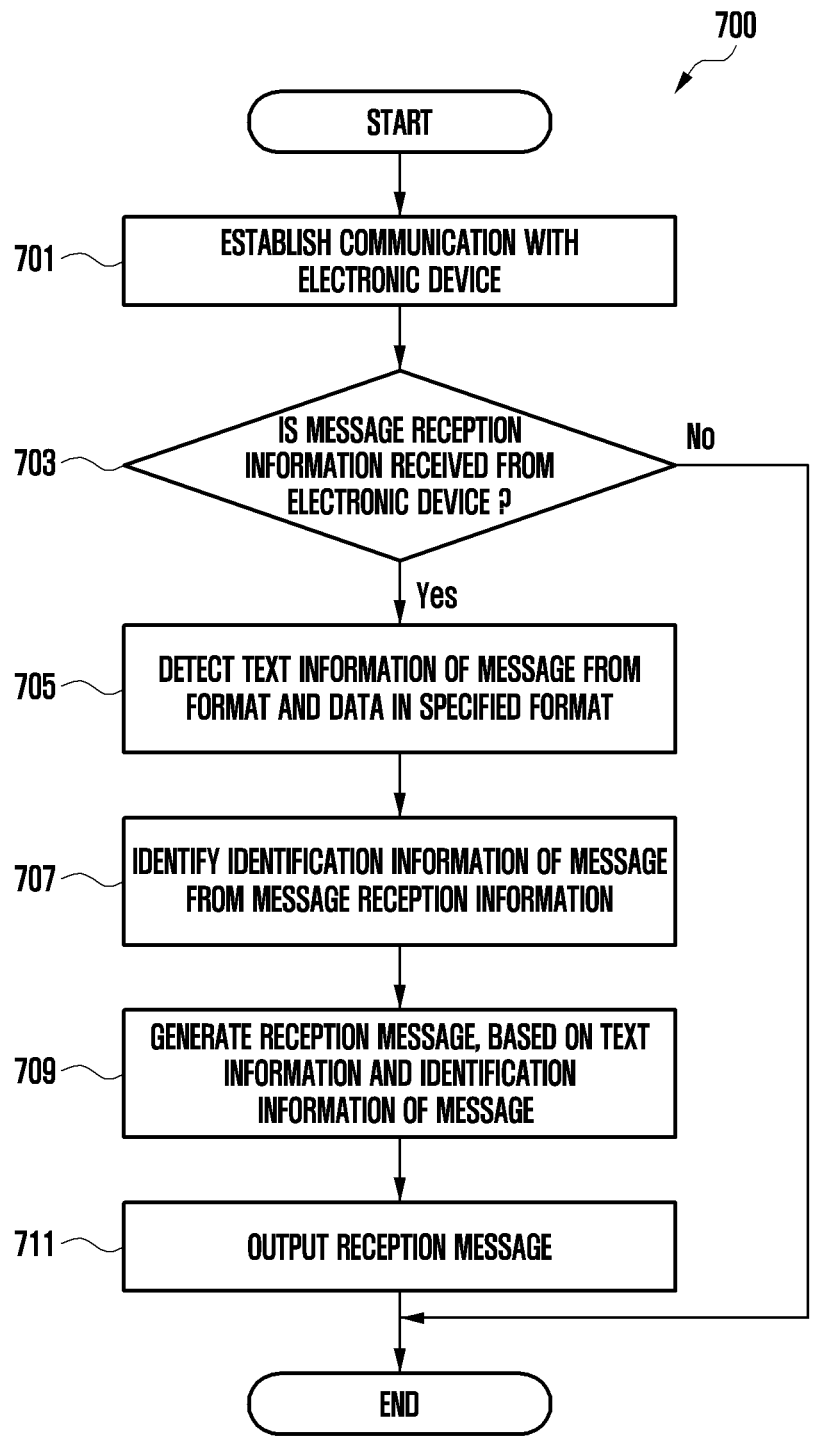
FIG. 7 is a flowchart showing that a wearable device processes a message according to certain embodiments.

FIG. 7 is a flowchart 700 showing that a wearable device processes a message according to certain embodiments. In the following embodiment, operations may be sequentially performed but are not necessarily sequentially performed. For example, the operations may be performed in a different order, or at least two operations may be performed in parallel. For example, the wearable device of FIG. 7 may be the electronic device 101 of FIG. 1 or the wearable device 210 of FIG. 2 or 4.

According to certain embodiments with reference to FIG. 7, in operation 701, the wearable device (e.g., the processor 120 or the wireless communication module 192 of FIG. 1 or the processor 400 or the communication circuit 410 of FIG. 4) may establish communication with an smartphone 200. According to an embodiment, the processor 400 may control the communication circuit 410 to establish the communication with the smartphone 200 through a second wireless network.

According to certain embodiments, in operation 703, the wearable device (e.g., the processor 120 or 400, the wireless communication module 192, or the communication circuit 410) may determine whether message reception information is received from the smartphone 200. According to an embodiment, the processor 400 may identify whether the message reception information is received from the smartphone 200 through the communication circuit 410.

According to certain embodiments, when no message reception information is received from the smartphone 200 (e.g., No in operation 703), the wearable device (e.g., the processor 120 or 400) may terminate an embodiment for processing a message.

According to certain embodiments, when receiving the message reception information from the smartphone 200 (e.g., Yes in operation 703), the wearable device (e.g., the processor 120 or 400) may detect text information of a message from a specified format and data in a specified format included in the message reception information in operation 705. According to an embodiment, the processor 400 may detect the specified format and the data in the specified format from raw data included in the message reception information. The processor 400 may detect text corresponding to substance of the message from the specified format and the data in the specified format. For example, the specified format (e.g., open rich card) and the data (e.g., JSON data) in the specified format may be configured as illustrated below in Table 1.

TABLE 1

```
{
"card":"open_rich_card",
"layout": {... ...
        "children": {... ...
            "text":{"[credit card] $1000.00 paid"}
        ... ...
        "text":{"declined :xxx-xxx-xxxx"}
        .......
    }
        }
}
```

For example, the processor 400 may detect the specified format (e.g., open rich card) and the data (e.g., JSON data) in the specified format (e.g., "children") from the raw data included in the message reception information. The processor 400 may detect data (e.g., "[credit card] $1000.00 paid" and "declined: xxx-xxx-xxxx") corresponding to a text field (e.g., "text") from the specified format and the data in the specified format.

In operation 707, the wearable device (e.g., the processor 120 or 400) may identify identification information of the message from the message reception information received from the smartphone 200. For example, the identification information of the message is for indicating a transmission agent (e.g., an base station 220) of the message received by the smartphone 200 and may include at least one of a callback number, information (e.g., a bot name) about the transmission agent of the message, or an SMS number.

In operation 709, the wearable device (e.g., the processor 120 or 400) may generate a reception message, based on the text information and the identification information of the message detected from the message reception information. The processor 400 may generate the reception message in a format supportable by the wearable device 210, based on the text information and the identification information of the message detected from the message reception information received from the smartphone 200. For example, the reception message in the format supportable by the wearable device 210 may include at least one of an SMS message and an MMS message.

In operation 711, the wearable device (e.g., the processor 120 or 400) may output the reception message. According to an embodiment, the processor 400 may control a display 420 to display a notification of the reception message and/or the substance of the message (e.g., the text information of the message). For example, the notification of the reception message may be output through at least one of vibrations, an audio signal, or an indication.

Figure 8:
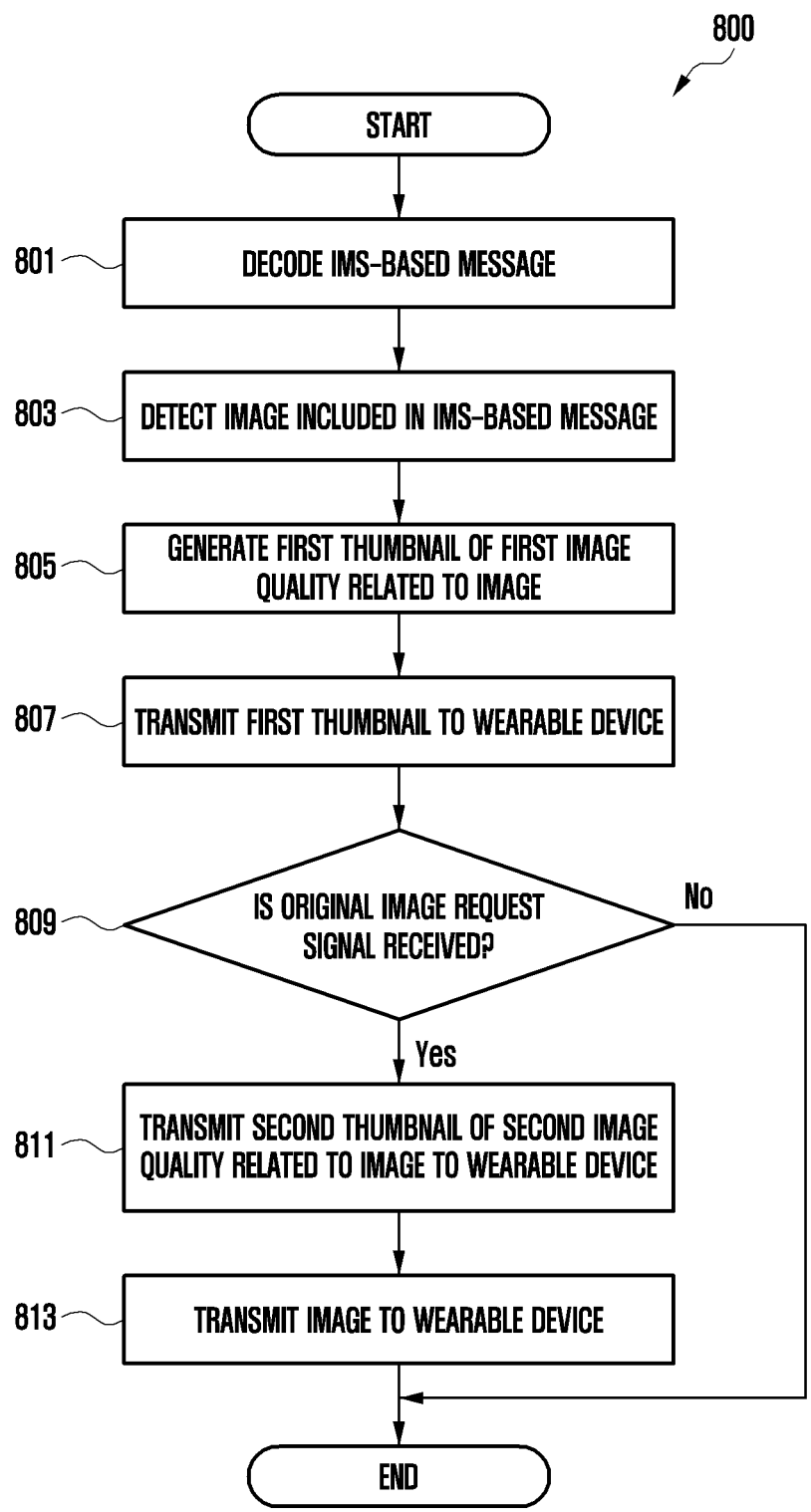
FIG. 8 is a flowchart showing that an electronic device transmits an image included in a message to a wearable device according to certain embodiments.

FIG. 8 is a flowchart 800 showing that an electronic device transmits an image included in a message to a wearable device according to certain embodiments. According to an embodiment, operations of FIG. 8 may be detailed operations of operation 505 and operation 507 of FIG. 5. In the following embodiment, the operations may be sequentially performed but are not necessarily sequentially performed. For example, the operations may be performed in a different order, or at least two operations may be performed in parallel. For example, the electronic device of FIG. 8 may be the electronic device 101 of FIG. 1 or the smartphone 200 of FIG. 2 or 3.

According to certain embodiments with reference to FIG. 8, when receiving an IMS-based message from an base station 220 (e.g., Yes in operation 503 of FIG. 5), the electronic device (e.g., the processor 120 of FIG. 1 or the processor 300 of FIG. 3) may decode the message received from the base station 220 in operation 801. When determining that the wearable device 210 does not support the IMS-based message received from the base station 220 through a first communication circuit 310, the processor 300 may decode the message received from the base station 220.

In operation 803, the electronic device (e.g., the processor 120 or 300) may detect an image included in the decoded IMS-based message. According to an embodiment, the processor 300 may detect the image in a data area of the decoded message.

In operation 805, the electronic device (e.g., the processor 120 or 300) may generate a thumbnail of a first image quality, which is a relatively low image quality, based on the image detected from the message.

In operation 807, the electronic device (e.g., the processor 120 or 300, the wireless communication module 192, or the second communication circuit 320) may transmit information related to the thumbnail of the first image quality to the wearable device 210. The processor 300 may control the second communication circuit 320 to transmit the thumbnail of the first image quality to the wearable device 210. The processor 300 may control the second communication circuit 320 to transmit the thumbnail of the first image quality and identification information of the message to the wearable device 210.

In operation 809, the electronic device (e.g., the processor 120 or 300, the wireless communication module 192, or the second communication circuit 320) may identify whether an original image request signal is received from the wearable device 210.

When receiving no original image request signal from the wearable device 210 (e.g., No in operation 809), the electronic device (e.g., the processor 120 or 300) may terminate an embodiment for transmitting the image included in the message to the wearable device.

When receiving the original image request signal from the wearable device 210 (e.g., Yes in operation 809), the electronic device (e.g., the processor 120 or 300, the wireless communication module 192, or the second communication circuit 320) may transmit a thumbnail of a second image quality, which is a relatively higher image quality than the first image quality, to the wearable device 210, based on the image detected from the message in operation 811. According to an embodiment, the thumbnail of the second image quality may be generated based on an input related to an original image request received through an input module (not shown) of the smartphone 200 or the original image request signal received from the wearable device 210 through the second communication circuit 320.

In operation 813, the electronic device (e.g., the processor 120 or 300, the wireless communication module 192, or the second communication circuit 320) may transmit the image detected from the message to the wearable device 210. According to an embodiment, the processor 300 may control the second communication circuit 320 to transmit the image (e.g., an original image) detected from the message to the wearable device 210 separately from transmission of the thumbnail of the second image quality. For example, the image detected in the message may be transmitted to the wearable device 210 through a background.

The smartphone 200 may generate a message in a form supported by the wearable device 210, based on the thumbnail of the first image quality related to the image detected from the message received from the base station 220 and the identification information of the message and may transmit the message to the wearable device 210. According to an embodiment, when determining that the wearable device 210 does not support the message received from the base station 220 through the first communication circuit 310, the processor 300 may generate the thumbnail of the first image quality related to the image detected from the message received from the base station 220. The processor 300 may generate the message in the form supported by the wearable device 210, based on the thumbnail of the first image quality and the identification information of the message. The processor 300 may control the second communication circuit 320 to transmit the message in the form supported by the wearable device 210 to the wearable device 210. For example, the message in the form supported by the wearable device 210 may include an SMS message or a multimedia messaging service (MMS) message.

Figure 9:
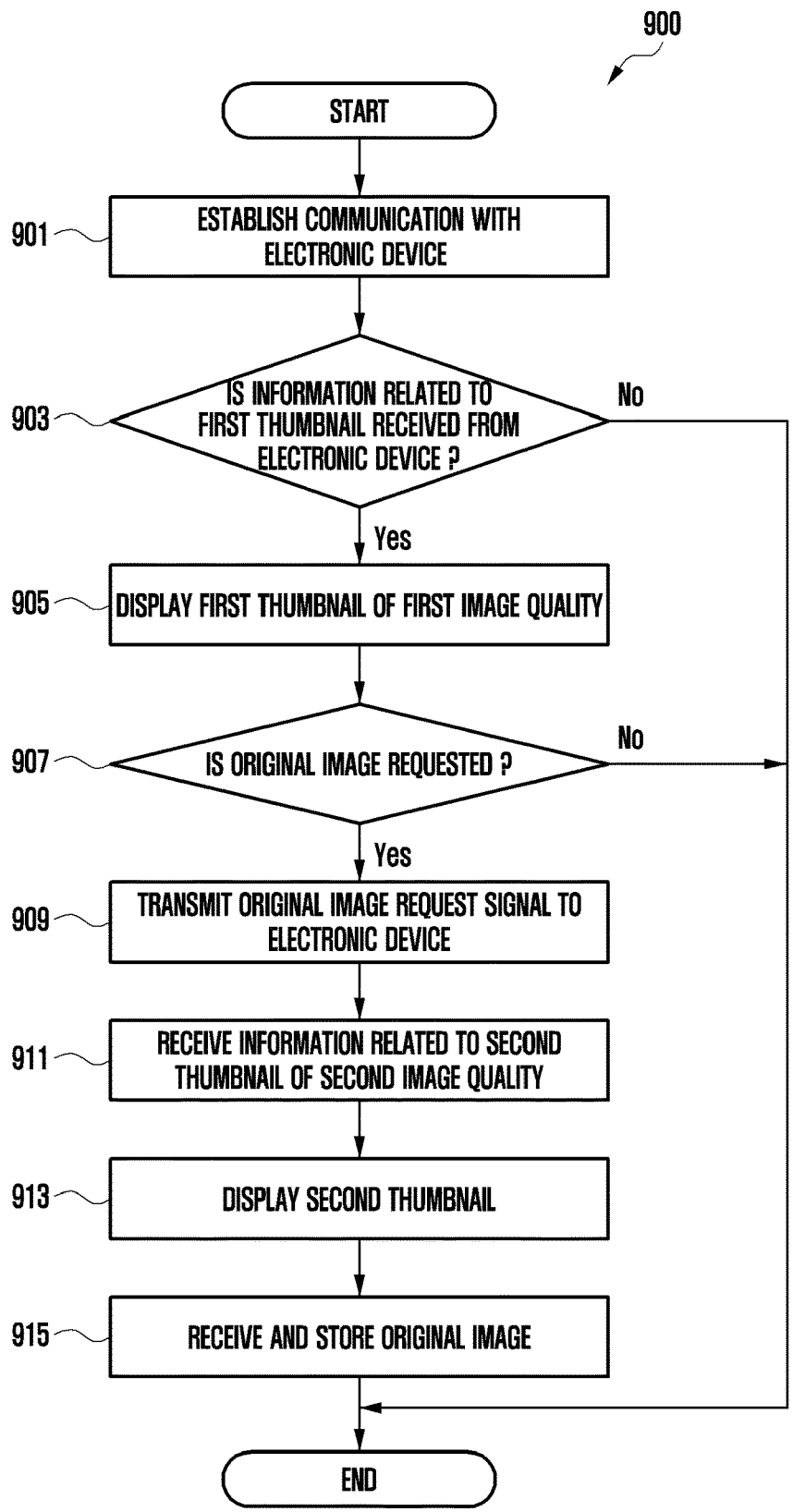
FIG. 9 is a flowchart showing that a wearable device displays an image according to certain embodiments.

FIG. 9 is a flowchart 900 showing that a wearable device displays an image according to certain embodiments. In the following embodiment, operations may be sequentially performed but are not necessarily sequentially performed. For example, the operations may be performed in a different order, or at least two operations may be performed in parallel. For example, the wearable device of FIG. 9 may be the electronic device 101 of FIG. 1 or the wearable device 210 of FIG. 2 or 4.

According to certain embodiments with reference to FIG. 9, in operation 901, the wearable device (e.g., the processor 120 or the wireless communication module 192 of FIG. 1 or the processor 400 or the communication circuit 410 of FIG. 4) may establish communication with an smartphone 200. According to an embodiment, the processor 400 may control the communication circuit 410 to establish the communication with the smartphone 200 through a second wireless network. For example, the second wireless network is short-range communication and may include at least one of a wireless LAN, Bluetooth, Bluetooth Low Energy (BLE), and infrared communication.

According to certain embodiments, in operation 903, the wearable device (e.g., the processor 120 or 400, the wireless communication module 192, or the communication circuit 410) may identify whether information related to a first thumbnail of a first image quality is received from the smartphone 200.

According to certain embodiments, when receiving no information related to the first thumbnail of the first image quality from the smartphone 200 (e.g., No in operation 903), the wearable device (e.g., the processor 120 or 400) may terminate an embodiment for displaying an image included in a message.

When receiving the information related to the first thumbnail of the first image quality from the smartphone 200 (e.g., Yes in operation 903), the wearable device (e.g., the processor 120 or 400) may display the first thumbnail of the first image quality in operation 905. According to an embodiment, the processor 400 may control a display 420 to display the first thumbnail of the first image quality, which is a relatively low image quality, received through the communication circuit 410 on at least a portion of a display area. According to an embodiment, the processor 400 may generate a reception message, based on the first thumbnail of the first image quality, which is a relatively low image quality, received through the communication circuit 410 and identification information of the message. The processor 400 may control the display 420 to display the reception message generated based on the first thumbnail of the first image quality on at least a portion of the display area.

The wearable device (e.g., the processor 120 or 400) may determine whether to request an original image in operation 907. According to an embodiment, the processor 400 may identify whether an input related to a request for the original image is received through an input module (not shown) of the wearable device 210. For example, the input related to the request for the original image may include a touch input related to the first thumbnail displayed on the display 420.

According to certain embodiments, when determining not to request the original image (e.g., No in operation 907), the wearable device (e.g., the processor 120 or 400) may terminate the embodiment for displaying the image included in the message. According to an embodiment, when the input related to the request for the original image is not received for a specified time, the processor 400 may determine that a user of the wearable device 210 does not request the original image.

According to certain embodiments, when determining to request the original image (e.g., Yes in operation 907), the wearable device (e.g., the processor 120 or 400, the wireless communication module 192, or the communication circuit 410) may transmit an original image request signal to the smartphone 200 in operation 909. According to an embodiment, when receiving the input related to the request for the original image within the specified time, the processor 400 may determine that the user of the wearable device 210 requests the original image. The processor 400 may control the communication circuit 410 to transmit the original image request signal to the smartphone 200. For example, the original image request signal may be transmitted to the smartphone 200 through a second wireless network with the smartphone 200.

According to certain embodiments, in operation 911, the wearable device (e.g., the processor 120 or 400, the wireless communication module 192, or the communication circuit 410) may receive information related to a second thumbnail of a second image quality from the smartphone 200 in response to the original image request signal. For example, the second thumbnail of the second image quality may include a thumbnail of a relatively higher image quality than the first image quality of the first thumbnail.

According to certain embodiments, in operation 913, the wearable device (e.g., the processor 120 or 400) may display the second thumbnail of the second image quality. According to an embodiment, the processor 400 may control the display 420 to change the first thumbnail displayed on at least the portion of the display area of the display 420 to the second thumbnail.

According to certain embodiments, in operation 915, the wearable device (e.g., the processor 120 or 400, the wireless communication module 192, or the communication circuit 410) may receive and store the original image from the smartphone 200. According to an embodiment, the processor 400 may receive the image (e.g., the original image) detected by the smartphone 200 from the message separately from the second thumbnail of the second image quality through the communication circuit 410. The processor 400 may store the image detected from the message in a memory 430. For example, the processor 400 may use the original image stored in the memory 430 when transmitting and/or editing the image.

According to certain embodiments, an operating method of an electronic device (e.g., the electronic device 101 of FIG. 1 or the smartphone 200 of FIG. 2 or FIG. 3) may include establishing communication with a wearable device (e.g., the wearable device 210 of FIG. 2 or FIG. 4), receiving an IP multimedia subsystem (IMS)-based message from an external device (e.g., the base station 220 of FIG. 2), detecting at least a portion corresponding to content of the IMS-based message by decoding the IMS-based message, and transmitting at least the portion corresponding to the content of the IMS-based message to the wearable device through the second communication circuit.

According to certain embodiments, an electronic device can comprise: a first communication circuit; a second communication circuit; and at least one processor configured to be operatively connected to the first communication circuit and the second communication circuit, wherein the at least one processor is configured to: establish communication with a second electronic device through the second communication circuit, receive an IP multimedia subsystem (IMS)-based message from a first communication network through the first communication circuit, detect at least a portion corresponding to content of the IMS-based message by decoding the IMS-based message, and transmit at least the portion corresponding to the content of the IMS-based message to the second electronic device through the second communication circuit.

According to certain embodiments, the IMS-based message may include a Rich Communication Services or Rich Communication Suite (RCS) message.

According to certain embodiments, the at least one processor is configured to decode the IMS-based message, detect raw data related to a specified content type and identification information of the message from the decoded message, wherein the identification information indicates a sender of the IMS-based message, and transmit the detected raw data and identification information to the second electronic device through the second communication circuit.

According to certain embodiments, the identification information of the IMS-based message may include at least one of a callback number, a short message service (SMS) number, or a name related to a transmission agent of the message.

According to certain embodiments, the detecting of at least the portion may include decoding the IMS-based message, and generating a first thumbnail having a first image quality based on an image included in the decoded message, when the decoded message includes the image.

According to certain embodiments, the transmitting of at least the portion to the second electronic device may include transmitting the first thumbnail to the second electronic device.

According to certain embodiments, the method may further include generating a second thumbnail of a second image quality, wherein the second thumbnail is a higher image quality than the first image quality, when receiving information related to an original image request from the wearable device, transmitting the second thumbnail to the second electronic device, and transmitting the image detected from the decoded message to the second electronic device.

According to certain embodiments, the method may further include outputting information related to the IMS-based message upon receiving the IMS-based message.

According to certain embodiments, the method may further include identifying whether the second electronic device supports the IMS-based message, based on a capability of the second electronic device, wherein the detecting of at least the portion may include detecting at least the portion corresponding to the content of the IMS-based message by decoding the IMS-based message when determining that the second electronic device does not support the IMS-based message.

According to certain embodiments, the method may further include transmitting the IMS-based message to the second electronic device when determining that the second electronic device supports the IMS-based message.

According to certain embodiments, an electronic device comprises: a display; a communication circuit; and at least one processor configured to be operatively connected to the communication circuit and the display, wherein the at least one processor is configured to: establish communication with another electronic device through the communication circuit, receive message reception information from the another electronic device through the communication circuit, detect identification information related to a message received by the another electronic device and data from the message reception information, generate a reception message, based on the identification information and the data, and control the display to display the reception message.

According to certain embodiments, the at least one the processor is configured to: detect data in a specified format of an open rich card format from raw data in the message reception information, and detect text in the message received by the another electronic device from the data in the specified format of the open rich card format.

Embodiments of the disclosure disclosed in the specification and drawings are merely to provide specific examples in order to easily describe the technical details according to embodiments of the disclosure and to assist understanding of the disclosure and are not intended to limit the scope of the disclosure. Therefore, the scope of certain embodiments of the disclosure should be interpreted to include all changes or modifications derived based on the technical idea of the disclosure in addition to the embodiments disclosed herein.

The invention claimed is:
1. An electronic device comprising:
first communication circuitry;
second communication circuitry; and
at least one processor; and
memory storing instructions that, when executed by the at least one processor individually or collectively, cause the electronic device to:
establish communication with a second electronic device through the second communication circuitry, and receive capability information of the second electronic device while establishing the communication with the second electronic device,
receive an IP multimedia subsystem (IMS)-based message from a first communication network through the first communication circuitry,
identify whether the second electronic device supports the IMS-based message based on the capability information of the second electronic device,
when identifying that the second electronic device does not support the IMS-based message based on the capability information of the second electronic device:
obtain a first thumbnail having a first image quality based on an image included in the IMS-based message by decoding the IMS-based message, and transmit the first thumbnail to the second electronic device through the second communication circuitry, in response to receiving information related to an original image request from the second electronic device through the second communication circuitry:

obtain a second thumbnail having a second image quality based on the image, wherein the second image quality is higher than the first image quality, transmit the second thumbnail to the second electronic device through the second communication circuitry, and transmit the image included in the IMS-based message to the second electronic device through the second communication circuitry.

2. The electronic device of claim 1, wherein the IMS-based message comprises a Rich Communication Services (RCS) message.

3. The electronic device of claim 1, wherein the first communication circuitry supports cellular communication or wireless local area network communication, and the second communication circuitry supports Bluetooth or Bluetooth Low Energy (BLE).

4. The electronic device of claim 1, further comprising a display, wherein the instructions that, when executed by the at least one processor, cause the electronic device to control the display to display information related to the IMS-based message.

5. A non-transitory computer readable medium storing a plurality of instructions, wherein execution of the plurality of instructions by an electronic device causes the electronic device to perform a plurality of operations comprising:

establishing communication with a second electronic device, and receiving capability information of the second electronic device while establishing the communication with the second electronic device;

receiving an IP multimedia subsystem (IMS)-based message from a first communication network;

identifying whether the second electronic device supports the IMS-based message based on the capability information of the second electronic device;

when identifying that the second electronic device does not support the IMS-based message based on the capability information of the second electronic device:

obtaining a first thumbnail having a first image quality based on an image included in the IMS-based message by decoding the IMS-based message; and transmitting the first thumbnail to the second electronic device;

in response to receiving information related to an original image request from the second electronic device:

obtaining a second thumbnail having a second image quality based on the image, wherein the second image quality is higher than the first image quality:

transmitting the second thumbnail to the second electronic device, and transmitting the image included in the IMS-based message to the second electronic device.

6. The non-transitory computer readable medium of claim 5, wherein the IMS-based message comprises a Rich Communication Services (RCS) message.

7. The non-transitory computer readable medium of claim 5, wherein the plurality of operations further comprises:

outputting information related to the IMS-based message upon receiving the IMS-based message.

* * * * *